United States Patent [19]

Marcon

[11] Patent Number: 4,803,041

[45] Date of Patent: Feb. 7, 1989

[54] PROCESS FOR THE RECYCLING OF NUCLEAR FUEL PELLETS PREVIOUSLY IRRADIATED IN A FAST NEUTRON NUCLEAR REACTOR

[75] Inventor: Jean-Pierre Marcon, Lyon, France

[73] Assignee: Novatome, Courbevoie, France

[21] Appl. No.: 927,757

[22] Filed: Nov. 6, 1986

[30] Foreign Application Priority Data

Nov. 8, 1985 [FR] France ................... 8516577

[51] Int. Cl.⁴ ............ G21C 19/34; G21C 21/08
[52] U.S. Cl. ..................... 376/261; 376/267; 376/436; 252/627; 29/906; 29/403.4
[58] Field of Search ........... 376/261, 267, 260, 436, 376/435; 219/10.57, 7.5; 252/626, 627; 423/4; 29/400 N, 402.01, 403.1, 403.3, 403.4, DIG. 3; 414/146

[56] References Cited

U.S. PATENT DOCUMENTS

| | | | |
|---|---|---|---|
| 3,336,201 | 8/1967 | Graham et al. | 376/267 |
| 3,928,128 | 12/1975 | Kollmar et al. | 376/267 |
| 3,929,961 | 12/1975 | Strong | 219/10.57 |
| 4,059,484 | 11/1977 | Bupp et al. | 376/435 |
| 4,158,601 | 6/1979 | Gerkey | 376/261 |
| 4,537,741 | 8/1985 | Christiansen et al. | 376/261 |
| 4,654,193 | 3/1987 | Amano et al. | 376/435 |

FOREIGN PATENT DOCUMENTS

| | | | |
|---|---|---|---|
| 1589850 | 9/1970 | Fed. Rep. of Germany . | |
| 2753831 | 6/1978 | Fed. Rep. of Germany | 376/261 |
| 2920304 | 12/1979 | Fed. Rep. of Germany | 376/267 |
| 1304439 | 8/1962 | France . | |
| 2080952 | 11/1971 | France . | |
| 2483673 | 12/1981 | France | 376/267 |
| 2522436 | 9/1983 | France | 376/261 |
| 0015895 | 1/1984 | Japan | 376/261 |
| 0839392 | 6/1960 | United Kingdom | 376/181 |
| 1097597 | 1/1968 | United Kingdom . | |

OTHER PUBLICATIONS

"Physics of Seed and Blanket Cores", Geneva Conference, vol. 13, p. 141, 1958.

Primary Examiner—Deborah L. Kyle
Assistant Examiner—Daniel Wasil
Attorney, Agent, or Firm—Pearne, Gordon, McCoy & Granger

[57] ABSTRACT

In order to multiply by three or four the combustion level of nuclear fuel pellets in fast neutron nuclear reactors, it is proposed that following a normal irradiation period of said pellets in the reactor core, that the irradiated can be replaced by a new can with an internal diameter slightly exceeding that of the first can. Thus, the pellets can undergo a new irradiation cycle in the reactor core. Preferably, the can is destroyed by progressive local melting over its entire length and the new can is preheated to facilitate the introduction of the pellets.

7 Claims, 1 Drawing Sheet

PROCESS FOR THE RECYCLING OF NUCLEAR FUEL PELLETS PREVIOUSLY IRRADIATED IN A FAST NEUTRON NUCLEAR REACTOR

BACKGROUND OF THE INVENTION

The invention relates to a process for the recycling of nuclear fuels contained in a first metal can, within which said pellets have previously been irradiated in a fast neutron nuclear reactor.

In fast neutron nuclear reactors, the fissile material is in the form of pellets, normally constituted by a mixed uranium and plutonium oxide ($UO_2$, $PuO_2$). These pellets are stacked within metal cans to form the nuclear fuel rods. These rods are arranged in bundles in sleeves with a hexagonal cross-section, so as to form nuclear fuel assemblies.

When a new assembly is placed in a fast neutron nuclear reactor core, there is a certain radial clearance between the nuclear fuel pellets and the cans containing said pellets. This initial clearance is provided to take account of the swelling of the pellets occurring under irradiation and to ensure a satisfactory introduction of the oxide pellets into the can during production.

Moreover, the irradiation time of the assemblies in the core of a fast neutron nuclear reactor is limited by the deformation undergone by the fuel rod and the hexagonal tube, said deformations being essentially caused by the swelling of the steel.

In the present state of the art, the nuclear fuel assemblies are then dismantled, the rods cut up and the fuel removed. These operations obviously take a long time and are very expensive, the latter particularly penalizing the costs of the fuel cycle of fast neutron nuclear reactors.

The present invention is based on the observation that when the irradiated assemblies are removed as a result of the swelling of the cans, the combustion level of the fuel pellets is low compared with the combustion possibilities intrinsically offered by said fuel.

In the particular case of a fast neutron clear reactor comprising a zero reactivity drop core, such as is proposed in French patent applications Nos. 84 12123 and 85 01203, reprocessing would be considerably spaced if the irradiation time of the assemblies was not limited by the swelling of the cans.

It would therefore appear that the limitation of the irradiation time of the assemblies imposed by the swelling of the cans leads to a mediocre exploitation of the possibilities offered by the actual fuel. In particular, the reprocessing of the fuel after a single irradiation period of limited duration is not justified and considerably increases operating costs.

SUMMARY OF THE INVENTION

The present invention relates to a process making it possible to recycle nuclear fuel pellets after they have undergone one or more irradiations. Thus, the reprocessing of the fuel can be eliminated or limited to the fuel which has reached very high combustion levels and namely roughly three times those presently achieved following a single irradiation. This leads to a considerable drop in operating costs.

The present invention therefore proposes a process for the recycling of nuclear fuel pellets contained in a first metal can in which these pellets have previously been irradiated in a fast neutron nuclear reactor, wherein the process comprises extracting the pellets from the first can and introducing them into a new metal can having a slightly larger internal diameter than that of the first can.

According to a preferred embodiment of the invention, the pellets are extracted from the first can by progressively melting the latter from one of its ends, the thus exposed pellets then being introduced immediately into the new can.

Preferably, the first can is then melted by means of a coil supplied by a high frequency electric current producing a thermal skin effect by induction.

In order to ensure that the melted can does not stick again to the remainder of the can, the melted part of the can is removed either by means of a refractory material deflector to which the first can only adheres after melting, or by blowing a neutral gas onto the melted part of the can.

According to another feature of the invention, the introduction of the pellets into the new can is facilitated by preheating the latter. Moreover, to limit contamination of the new can, it is preferable to place the latter within a sleeve.

DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
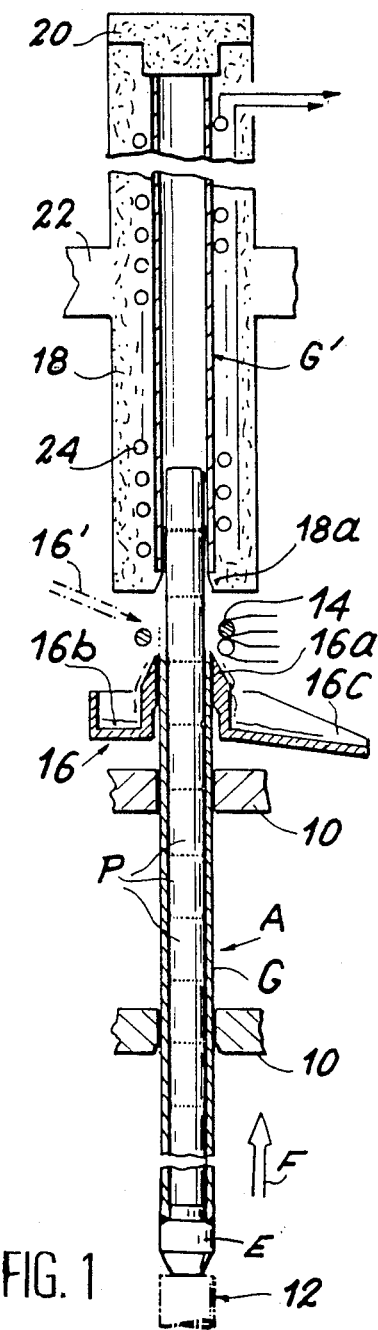
FIG. 1, a diagrammatic longitudinal sectional view of an installation for performing the process according to the invention, the installation being shown in operation.

The installation shown very diagrammatically in FIG. 1 firstly comprises guides 10 making it possible to maintain and guide in vertical position a rod A previously irradiated in the core of a fast neutron nuclear reactor.

In per se known manner rod A comprises a metal can G (e.g. of stainless steel), which is tubular and in which is located a stack of pellets P constituting the nuclear fuel. These pellets P are generally formed from a mixed uranium and plutonium oxide ($UO_2$, $PuO_2$). However, it is readily apparent that the process according to the invention can be used no matter what the constitution of the pellets contained in the can and particularly when the mixed oxide is replaced by a carbide or by a nitride.

When located in a nuclear fuel assembly, rod A also has upper and lower end fittings closing the ends of can G. The upper end fitting is removed by cutting off the can end before the rod is introduced into the installation of FIG. 1, which explains why it does not appear in the latter. As a result of the irradiation of rod A in the fast neutron reactor core, the radial clearance J which initially existed between pellets P and can G (FIG. 2a) has disappeared under the effect of the swelling of the pellets (FIG. 2b). Thus, to some extent the pellets are set in can G.

The installation shown in FIG. 1 also comprises a rod raising means with a plunger or piston 12, which bears on the lower end of rod A. This plunger is progressively actuated, e.g. by means of a not shown jack, so that it progressively raises rod A along its vertical axis between guides 10 (arrow F in FIG. 1). Plunger 12 can optionally be replaced by a clamp, clip or similar device.

A fixed heating device is located above the highest guide 10. At the start of a cycle, the upper end of rod A, whose can is to be replaced, is brought level with the heating device. The latter surrounds can G and makes it possible to locally raise the temperature up to its melting point without causing any deterioration of pellets P.

In the represented embodiment, the heating device is constituted by an induction heating coil 14. The latter comprises at least one turn and its vertical axis coincides with that of the plunger 12 and guides 10.

Coil 14 is supplied by a high frequency alternating current. Through the skin effect, it is possible to induce electric currents in the metal can G, which is a good electricity conductor. Thus, there is local heating by induction of can G, which has the effect of progressively melting the latter as rod A is raised by plunger 12. The fissile material constituting the pellets P is a poor conductor of electricity, so that the pellets are not really heated by coil 14.

Preferably, in order to prevent the molten can metal from sticking again to the lower unmelted part thereof, the installation comprises means for discharging the metal as it melts.

In the embodiment shown in continuous line form in FIG. 1, these means are constituted by a fixed annular deflector 16 made from a refractory material, disposed around rod A and coaxially thereto, immediately below coil 14. The upper part 16a of deflector 16 behaves in the manner of a scraper closely surrounding the still unmelted can G. For this purpose, the upper end of part 16a of the scraper is tapered, so as to permit the flow of molten metal towards an annular channel 16b constituting the lower part of deflector 16. As illustrated in FIG. 1, channel 16b is extended by a ramp 16c for removing the molten metal.

According to a constructional variant shown in mixed line form in FIG. 1, deflector 16 is replaced by one or more nozzles 16' by which a neutral gas, such as argon is blown onto can G, in the immediate vicinity of coil 14. This solution also makes it possible to remove the molten metal and prevents its sticking again to the unmelted can. However, it suffers from the risk of dispersing molten metal into the cell where the installation is located.

In its upper part, the installation shown in FIG. 1 comprises means making it possible to support in fixed manner a new can G', so that the latter is disposed coaxially to rod A and its lower end is as close as possible to heating coil 14.

In the represented embodiment, these supporting means comprise a jacket 18, in which can G' is introduced up to a lower abutment 18a. Any upward displacement of can G' is then prevented by the putting into place of a plug 20 above jacket 18. The latter being fitted in a fixed support 22, the positioning of the new can G' with respect to the lower portion of the installation is ensured. Apart from its supporting function, the jacket 18 makes it possible to at least partly protect the new can G' against contamination from the irradiated rod A.

As illustrated in FIG. 1, jacket 18 also preheats the new can G', e.g. to a temperature of approximately 600° C. For this purpose, a preheating device, e.g. comprising an electrical resistor 24 helically wound around can G' is embedded in jacket 18 over the entire height of the can. This preheating device facilitates the introduction of pellets P of irradiated rod A into the new can G', whilst ensuring an expansion of said can and consequently an increase in its internal diameter.

Figure 2A:
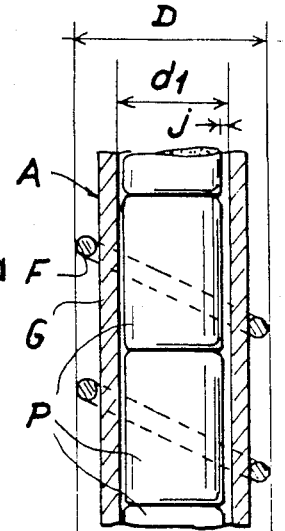
FIGS. 2a, 2b and 2c, larger scale views respectively showing, in part section, part of a new rod and its spacing wire, part of the same rod and the same wire after irradiation and a new rod constituted by previously irradiated pellets and a new can, together with the spacing wire of said new rod.
Figure 2B:
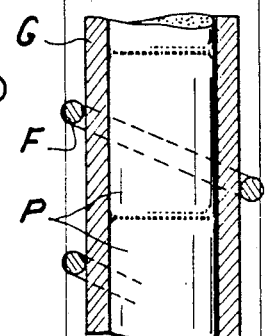
Figure 2C:
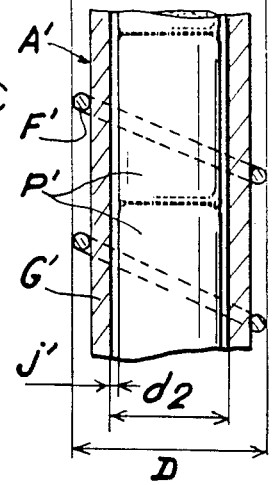

According to an essential feature of the invention, the internal diameter $d_2$ of the unexpanded new can G' (FIG. 2c) is slightly greater than the internal diameter $d_1$ of the preceding can G of rod A (FIG. 2c). Thus, as the object of the invention is to permit a new irradiation of the pellets P in a fast neutron nuclear reactor core, it is necessary to provide a certain radial clearance j' (FIG. 2c) between the pellets P which have already undergone at least one previous irradiation and the interior of the new can G'. As a result of this clearance j', it is clear that the preheating of the new can G' is not indispensable to the invention and soley serves to facilitate the introduction of the pellets into the can.

As a result of the installation described hereinbefore, the progressive raising of rod A ensured by plunger 12 has the effect of progressively introducing the stack of pellets P into the new can G', substantially immediately after the part of the irradiated can G surrounding said pellets has been melted with the aid of coil 14. Thus, a rod can can be changed without any mechanical stressing of the nuclear fuel pellets P. The latter aspect is particularly important, because said pellets are relatively fragile.

Preferably, the inactive lower end fitting E of rod A remains in place, which makes it possible to prevent a deterioration of plunger 12 by the heating coil 14.

When the can change has been completed, the assembly constituted by the new can G' containing the stack of pellets P is transferred to another station, where new upper and lower end fittings are fitted in order to complete the rod.

It should be noted that this process can be carried out several times in succession on the same nuclear fuel pellets. On each occasion, the swelling of the pellets under irradiation is compensated by placing them in a can, whose internal diameter is slightly increased. In this way, it is possible to eliminate the reprocessing of nuclear fuel or to only carry out said reprocessing in the case of fuel which has been subject to very high combustion levels, namely about three time the levels presently achieved following a single irradiation.

For each nuclear fuel pellet recycling, it is possible to save the reprocessing costs and the transporation costs necessary for said reprocessing, the costs of the installation permitting said recycling being very small compared with that of the reprocessing.

Moreover, the capital expenditure necessary for the definitive storage of the fuel or its reprocessing can be delayed for roughly 10 years with respect to the start-up of a fast neutron nuclear reactor.

FIGS. 2a, 2b and 2c also show the spacing wire F and F' respectively surrounding rod A having the first can G and road A' having the new can G' within assemblies in which said rods are placed.

In order that the overall dimensions of rods A and A', defined by the cylinder diameter D, which envelopes the spacing wired F and F', remains unchanged despite the diameter difference between can G and G' (internal diameters $d_1$ and $d_2$), it can be seen in FIGS. 2a and 2c that the diameters of the spacing wires F and F' differ. More specifically, the diameter of spacing wire f' is slightly smaller than that of spacing wire F.

Obviously, the invention is not limited to the embodiment described hereinbefore and variants thereof are also covered. Thus, although the irradiated rod can is preferably eliminated by its melting, other gentle can destruction methods can also also be considered.

Thus, it is possible to cut the irradiated rod can along at least two generatrixes thereof in order to separate it from the stack of pellets with applying excessive mechanical stresses thereto. In the case where the can is removed by heating, any known heating means can be used in place of the aforementioned induction heating device. However, the latter is particularly advantageous, because it induces substantially no heating of the nuclear fuel pellets.

Moreover, the kinematics on the installation can be reversed, the rod A then remaining fixed whereas the heating device and the part carrying the new can move progressively along the rod axis.

In the same way, any type of fuel, oxide, carbide, nitride, etc can undergo recycling in this way, as well as a random metal can material.

What is claimed is:

1. A process for the recycling of nuclear fuel pellets contained in a first metal can in which these pellets and said first metal can have previously been irradiated in a fast neutron nuclear reactor, wherein the process comprises extracting the pellets from the first irradiated can and introducing these pellets into a second unirradiated metal can before irradiating again said pellets contained in said unirradiated second metal can in a fast neutron reactor, said unirradiated metal can having a larger internal diameter than the internal diameter of the first can when said first can was in an unirradiated state, wherein the pellets are extracted from the first can by progressively melting the first can from one of its ends, the thus exposed pellets being maintained in their orientation and position in the stack and then being immediately introduced into the new can.

2. A process according to claim 1, wherein the first can is melted by means of a coil supplied by a high frequency electric current producing a skin effect by induction.

3. A process according to claim 1, wherein the first can is removed immediately after it has melted.

4. A process according to claim 3, wherein the first can is removed by means of a refractory material deflector and to which the first can does not adhere after melting.

5. A process according to claim 3, wherein the first can is removed by blowing a neutral gas.

6. A process according to claim 1, wherein the pellets are introduced into the new can after preheating the latter.

7. A process according to claim 1, wherein the new can is placed in a sleeve or jacket limiting the contamination thereof.

* * * * *